(No Model.)

C. E. BEAN.
HEAT REGULATOR FOR INCUBATORS.

No. 382,403. Patented May 8, 1888.

Witnesses:
William H. Perry
O. E. Rowell

Inventor:
Charles E. Bean
by Sylvenus S. Walker
Attorney

UNITED STATES PATENT OFFICE.

CHARLES E. BEAN, OF WESTPORT, ASSIGNOR OF ONE-HALF TO MATHEW C. YARWOOD, OF FALL RIVER, MASSACHUSETTS.

HEAT-REGULATOR FOR INCUBATORS.

SPECIFICATION forming part of Letters Patent No. 382,403, dated May 8, 1888.

Application filed May 14, 1886. Serial No. 202,210. (No model.)

*To all whom it may concern:*

Be it known that I, CHARLES E. BEAN, of Westport, in the county of Bristol and State of Massachusetts, have invented an Improvement in Heat-Regulators for Incubators, of which the following is a specification.

The object of my invention is to provide more sensitive or nicely-adjusting devices for actuating the heat-regulators, so as to insure a certain degree of temperature being maintained within the incubator uniformly at all times, whereby all the eggs placed therein may be hatched at the regular period without loss occasioned by change in the temperature of the air during incubation, as very frequently occurs in incubators heretofore employed; and it consists in the construction, combination, and arrangement of air-chambers, whereby the expansion of the air contained therein by the heater shall serve to actuate the dampers or regulators for controlling the amount of heat, and also the temperature of the heated air contained within the incubator, automatically, as hereinafter more fully described, and specifically set forth in the claims.

Figure 1:
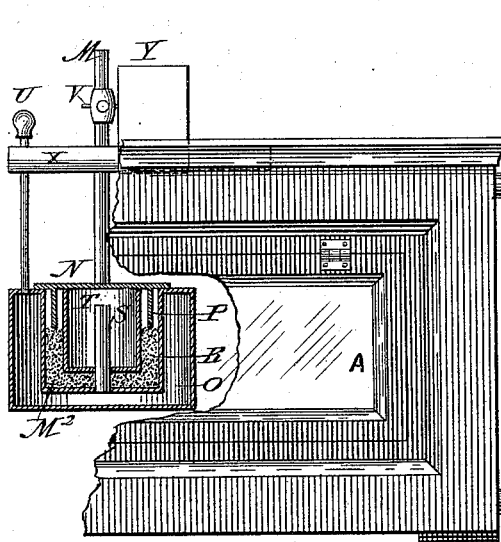
Figure 1:
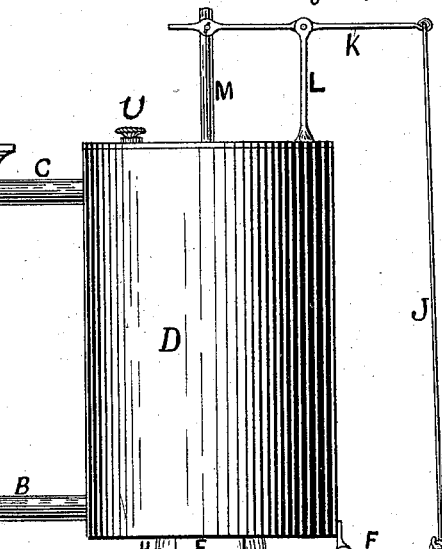
Figure 4:
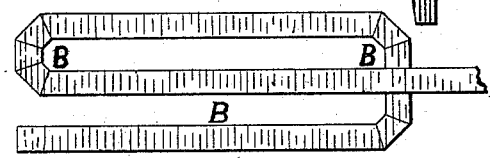
Figure 5:
Figure 3:
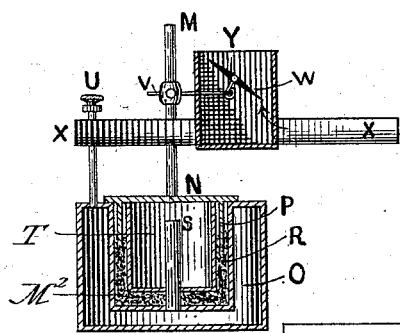
Figure 6:
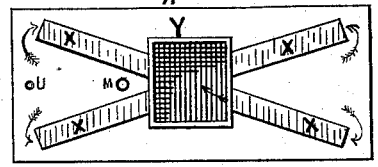
Figure 2:
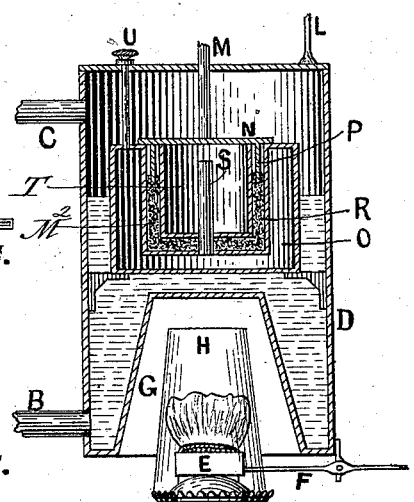

Figure 1 represents a side elevation of a heater and actuating mechanism connected with one end of the incubator-case constructed in accordance with my invention. Fig. 2 represents a vertical central section of the heater and interior air-heating chamber. Fig. 3 represents a vertical sectional elevation of an air-heating chamber and actuating devices removed from the incubator-case. Fig. 4 represents a plan of a hot-water heating-pipe removed from the bottom interior portion of the incubator-case. Fig. 5 represents a vertical lateral section of the same. Fig. 6 represents a plan of the hot-air pipes in the top portion of the incubator-case, with the hot-air escape. Fig. 7 represents a vertical section through the hot-air pipes and air-escape removed.

A represents one end portion of the incubator-case, to which is connected near the bottom the hot-water pipe or conduit B, which extends within the said case A through the center to the opposite end thereof, and is then deflected so as to pass near one side of the case and returns back and crosses near the end to the opposite side, and then extends lengthwise again and terminates near the opposite end of the case from the point of entrance, passing horizontally through the interior of the case, as usual; but in order to obtain a greater amount of heat or equalization and uniformity of radiation therefrom I construct the conduit B flat or rectangular in cross-section, as shown in Figs. 4 and 5.

C represents a heating-pipe connecting the interior of the heater D with the top portion of the said case A, as usual. The heater D is provided with a conical chamber or opening, G, extending centrally upward within the bottom portion thereof, as shown in Fig. 2, and within this opening is arranged the upward end portion of the chimney H, supported upon the top of the lamp or oil reservoir I, provided with a burner, as shown. The wick-tube of the burner is provided with an adjustable sleeve, E, which is adapted to slide up or down on the said tube, so as to extend more or less above the upper end thereof, and thereby diminish or increase the surface of the lamp-wick to combustion when lighted, and thus regulate the heat therefrom, as heretofore employed for the purpose. This adjustable wick-tube sleeve E is actuated by means of the pivoted horizontal lever F, having one end connected to the said sleeve and pivoted mid-length to a support or bracket connected to the bottom of the heater and its opposite end pivoted or loosely connected to the lower end of the vertical actuating-rod J, the upper end of which is pivoted or loosely connected with the outer end of the horizontal lever K, which is pivoted centrally to the upper end of the vertical support L, which is secured to the upper end of the heater D, as shown. The opposite end of the said horizontal lever K is connected with the upper end portion of the vertically-sliding valve-stem or actuating-rod M, which passes through an opening formed in the upper end or head of the heater D, and is connected at its lower end with the head N of the adjusting hot-air valve, which is formed by the downward-projecting annular flange P, the upper edge of which is secured to said head, and its lower edge is received within a corresponding annular channel, R, provided around the hot-air chamber O, which is connected with the interior of the said hot-air valve N P by the vertical tube S, the open upper end of which terminates near the inward face of the said head N of the said hot-air valve, as shown in Fig. 2.

In order that the expansion of the heated air in the said air-chamber O may serve to raise the said hot-air valve by passing upward through the short tube S and not escape from the valve-chamber T, the lower edge of the said annular flange P is seated or immersed in quicksilver or mercury, $M^2$, provided within the said annular channel R, as shown. Now it will be seen and understood that if the air contained in the air-chamber O should be expanded by heat beyond the limit or temperature desired the said hot-air valve would be raised, actuating the connecting-rod M, lever K, vertical rod J, and lever F, so as to raise the said sleeve E on the wick-tube and thereby diminish the heat accordingly or correspondingly, as desired, to retain the heat or temperature within the incubator-case at, say, 106° Fahrenheit. In case the quantity of air in the air-chamber O, when heated to the proper temperature, should be found when expanded to exceed the limit required to actuate, regulate, and control the heat, an outlet-pipe, U, is provided, connecting with the interior of the air-chamber at one end, the other end extending through the top and having a screw-cap or suitable removable plug or stopper, as shown in Fig. 2.

In order to equalize and control the heated air within the incubator-case A and insure an exact temperature to be maintained during incubation, there is provided therein a similar air-chamber, O, having an interior annular channel, R, and hot-air valve connected with the said air-chamber O by the vertical tube S, the upper open end of which terminates within the valve-chamber T near the top or head end of the air-valve, which is provided with a downward-projecting annular flange, P, which operates within a corresponding channel, R, and is seated or immersed at its lower edge in mercury, $M^2$, provided within the said annular channel, as shown in Fig. 3.

A short vertical rod, M, is secured to the valve-head N and extends through the top of the incubator-case A, and is provided with a connection which may be adjusted and held thereon with a set-screw, or as desired, and to which one end of the short horizontal arm or rod V is loosely connected, the opposite end being connected or pivoted to the short lever-arm of the horizontally-pivoted regulating-damper W, arranged within the vertical outlet or air-passage Y, as shown in Fig. 3.

To control and equalize the temperature of the air within the said case A, there is provided four diverging air-outlet tubes, X, the outward open ends of which terminate a short distance from the four corners of the case, as shown in Fig. 6, and their convergent inward open ends terminate within the said vertical outlet air-passage Y, as shown in Fig. 7. The said air-chamber O is likewise provided with a vertical outlet-pipe, U, extending through the top of the case and provided with a screw-cap, as before described in relation to the former air-chamber O, and as the construction and operation of the said two air-chambers O O, valves, and connections are so nearly identical it will be understood without further description.

Having thus described my invention, what I claim is—

The combination, with the heater D, of the air-chamber O, annular channel R, provided with mercury, $M^2$, the air-valve N P, valve-chamber T, vertical tube S, outlet-pipe U, valve-rod M, lever K, rod J, lever F, and wick-tube sleeve E, as set forth.

CHARLES E. BEAN.

Witnesses:
 WILLIAM F. THOMAS,
 HENRY H. EARL.